United States Patent
Deopujari et al.

(10) Patent No.: US 8,688,643 B1
(45) Date of Patent: Apr. 1, 2014

(54) SYSTEMS AND METHODS FOR ADAPTIVELY PREFERRING MIRRORS FOR READ OPERATIONS

(75) Inventors: Anandi Deopujari, Pune (IN); Niranjan Pendharkar, Pune (IN); Michael Wahl, Georgetown, TX (US)

(73) Assignee: Symantec Corporation, Mountain View, CA (US)

( * ) Notice: Subject to any disclaimer, the term of this patent is extended or adjusted under 35 U.S.C. 154(b) by 369 days.

(21) Appl. No.: 12/857,048

(22) Filed: Aug. 16, 2010

(51) Int. Cl.
 *G06F 17/00* (2006.01)
 *G06F 11/20* (2006.01)

(52) U.S. Cl.
 CPC ........ *G06F 11/2056* (2013.01); *G06F 11/2058* (2013.01)
 USPC .......................................... 707/655; 707/659

(58) Field of Classification Search
 CPC .......................... G06F 11/2056; G06F 11/2058
 USPC .................. 707/655–665, 610–612; 711/102; 714/6.28
 See application file for complete search history.

(56) References Cited

U.S. PATENT DOCUMENTS

| | | | |
|---|---|---|---|
| 6,799,214 B1 * | 9/2004 | Li | 709/226 |
| 2006/0129559 A1 * | 6/2006 | Sankaran et al. | 707/10 |
| 2006/0190682 A1 * | 8/2006 | Noguchi et al. | 711/114 |
| 2011/0035547 A1 * | 2/2011 | Kidney et al. | 711/114 |
| 2011/0072430 A1 * | 3/2011 | Mani | 718/1 |
| 2011/0246615 A1 * | 10/2011 | Hahn et al. | 709/219 |

* cited by examiner

*Primary Examiner* — Wilson Lee
(74) *Attorney, Agent, or Firm* — ALG Intellectual Property, LLC

(57) ABSTRACT

A computer-implemented method for adaptively preferring mirrors for read operations may include identifying a volume of data. The computer-implemented method may also include identifying a plurality of mirrors that mirror the volume of data. The computer-implemented method may further include identifying a storage property of at least one mirror in the plurality of mirrors. The computer-implemented method may additionally include identifying at least one attempt to read from the volume of data. The computer-implemented method may also include selecting the mirror for fulfilling the read attempt based at least in part on the storage property of the mirror. The computer-implemented method may further include fulfilling the read attempt from the selected mirror. Various other methods, systems, and computer-readable media are also disclosed.

20 Claims, 6 Drawing Sheets

SYSTEMS AND METHODS FOR ADAPTIVELY PREFERRING MIRRORS FOR READ OPERATIONS

BACKGROUND

In the digital age, organizations may store, manage, and access increasingly large amounts of data. In order to improve the fault tolerance of data storage systems and thereby protect data against accidental loss or corruption, some organizations may store data using mirrored volumes. A mirrored volume may include multiple mirrors. Each mirror may store a copy of the volume, and any mirror may be read from when reading from the volume.

A volume manager that manages a mirrored volume may enable an administrator to configure the mirrored volume by selecting a mirror to read from in order to fulfill reads directed to the volume. Unfortunately, an administrator may select a mirror that performs poorly, which may compromise the performance of the mirrored volume. Accordingly, the instant disclosure identifies a need for systems and methods for adaptively preferring mirrors for read operations.

SUMMARY

As will be described in greater detail below, the instant disclosure generally relates to systems and methods for adaptively preferring mirrors for read operations. Systems and methods described herein may automatically select a mirror from which to fulfill reads directed to a volume. These systems and methods may use a variety of types of information when selecting the mirror, including the media types of storage devices underlying each mirror (e.g., solid-state drive, hard-disk drive, non-volatile random access memory, etc.). For example, a method may include identifying a volume of data, identifying a plurality of mirrors that mirror the volume of data, identifying a storage property of at least one mirror in the plurality of mirrors, identifying at least one attempt to read from the volume of data, selecting the mirror for fulfilling the read attempt based at least in part on the storage property of the mirror, and then fulfilling the read attempt from the selected mirror.

In some examples, the systems described herein may identify the storage property of the mirror by identifying at least one storage device underlying the mirror and then by identifying a property of the storage device. The property of the storage device may include a variety of information, such as a latency of the storage device and/or a throughput of the storage device. Additionally or alternatively, the property of the storage device may include a media type of the storage device. Accordingly, the storage property of the mirror may include an indication of a variety of media types of the underlying storage device (e.g., an indication that the storage device is a solid-state drive, an indication that the storage device is non-volatile random access memory, an indication that the storage device is a hard disk drive, etc.).

In some examples, the mirror may include a plurality of storage devices. In these examples, the systems described herein may identify a property for each storage device in the plurality of storage devices (e.g., to combine the properties of the storage devices to determine the storage property of the mirror).

The systems described herein may select the mirror for the read attempt in a variety of ways and within a variety of contexts. For example, the systems described herein may select the mirror as a preferred mirror, thereby preferring the mirror for fulfilling subsequent read attempts directed to the volume of data. Additionally or alternatively, the systems described herein may select a subset of mirrors from the plurality of mirrors. These systems may then select the mirror from the subset based on a rotation schedule applied to the subset of mirrors.

In some examples, the systems described herein may, after selecting a subset of mirrors from the plurality of mirrors, divide the read attempt into a plurality of read operations. In these examples, these systems may fulfill the read attempt by performing each read operation in the plurality of read operations on a corresponding mirror in the subset of mirrors. In some examples, the volume of data may be configured for use within a block virtualization environment.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
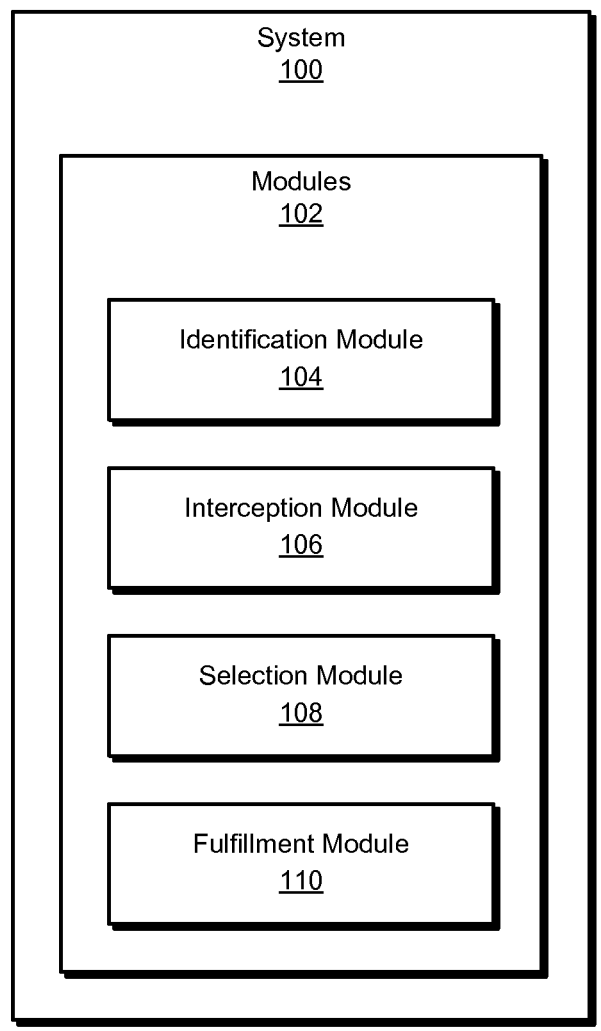
FIG. 1 is a block diagram of an exemplary system for adaptively preferring mirrors for read operations.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for adaptively preferring mirrors for read operations. Systems and methods described herein may automatically choose mirrors from which to fulfill read attempts directed to mirrored volumes based on properties of the mirrors and/or storage devices underlying the mirrors. These properties may include the media types of the underlying storage devices (e.g., solid-state drive, hard-disk drive, non-volatile random access memory, etc.) and/or measures of input/output efficiency (e.g., latency, throughput, etc.).

By leveraging information about the storage devices underlying the mirrors of the volume, these systems and methods may select mirrors with better performance, thereby increasing the performance of the volume without requiring special investigation, experimentation, and/or configuration by an administrator.

Figure 2:
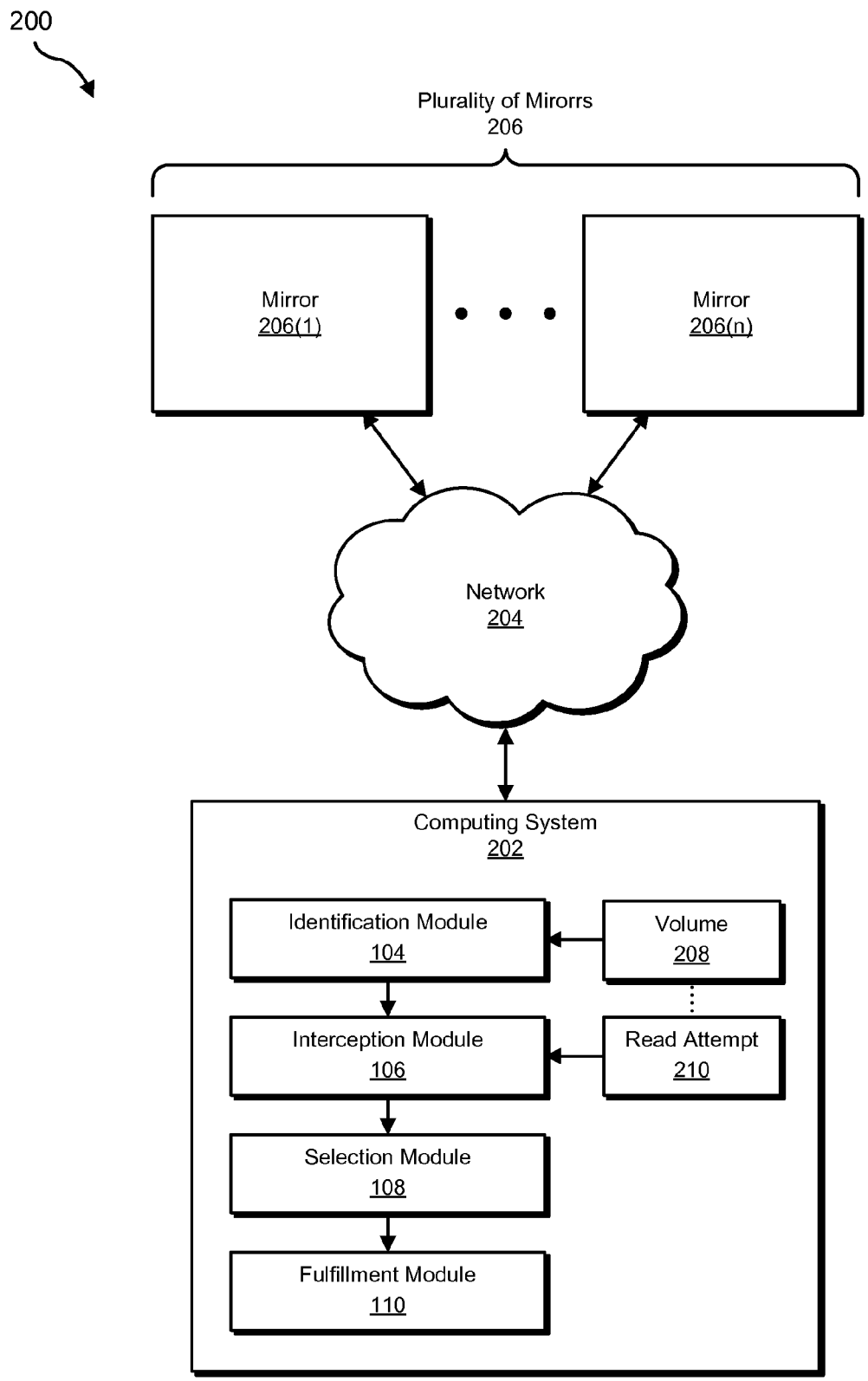
FIG. 2 is a block diagram of an exemplary system for adaptively preferring mirrors for read operations.

The following will provide, with reference to FIGS. 1-2, detailed descriptions of exemplary systems for adaptively preferring mirrors for read operations. Detailed descriptions of corresponding computer-implemented methods will also be provided in connection with FIG. 3. Further descriptions of these systems and methods will be provided in conjunction with descriptions of an exemplary plurality of mirrors illustrated in FIG. 4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for adaptively preferring mirrors for read operations. As illustrated in this figure, exemplary system 100 may include one or more modules 102 for performing one or more tasks. For example, and as will be explained in greater detail below, exemplary system 100 may include an identification module 104 programmed to identify a volume of data, identify a plurality of mirrors that mirror the volume of data, and identify a storage property of at least one mirror in the plurality of mirrors. Exemplary system 100 may also include an interception module 106 programmed to identify at least one attempt to read from the volume of data.

In addition, and as will be described in greater detail below, exemplary system 100 may include a selection module 108 programmed to select the mirror for fulfilling the read attempt based at least in part on the storage property of the mirror. Exemplary system 100 may also include a fulfillment module 110 programmed to fulfill the read attempt from the selected mirror. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as computing system 202 illustrated in FIG. 2, computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be deployed in a variety of ways. For example, all or a portion of exemplary system 100 may represent portions of a cloud-computing or network-based environment, such as exemplary system 200 illustrated in FIG. 2. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

As shown in FIG. 2, system 200 may include a computing system 202 in communication with a plurality of mirrors 206 via a network 204. In one embodiment, and as will be described in greater detail below, computing system 202 may include identification module 104, interception module 106, selection module 108, and fulfillment module 110.

Identification module 104 may be programmed to identify volume 208. Identification module 104 may also be programmed to identify plurality of mirrors 206. Identification module 104 may further be programmed to identify a storage property of at least one mirror (e.g., mirror 206(1)) in plurality of mirrors 206. Interception module 106 may be programmed to identify a read attempt 210 directed to a volume 208. Selection module 108 may be programmed to select mirror 206(1) for fulfilling read attempt 210 based at least in part on the storage property of mirror 206(1). Fulfillment module 110 may be programmed to fulfill read attempt 210 from mirror 206(1).

Computing system 202 generally represents any type or form of computing device capable of reading computer-executable instructions. Examples of computing system 202 include, without limitation, laptops, desktops, servers, cellular phones, personal digital assistants (PDAs), multimedia players, embedded systems, combinations of one or more of the same, exemplary computing system 510 in FIG. 5, or any other suitable computing device.

Plurality of mirrors 206 generally represents any type or form of computer storage. Plurality of mirrors 206 may include physical and/or virtual storage devices. In some examples, a mirror within the plurality of mirrors may use a single storage device. Additionally or alternatively, a mirror within the plurality of mirrors may use multiple storage devices.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between computing system 202 and plurality of mirrors 206.

In some examples, system 200 may represent a redundant data storage solution for an enterprise environment. For example, volume 208 may be redundantly stored as plurality of mirrors 206.

Figure 3:
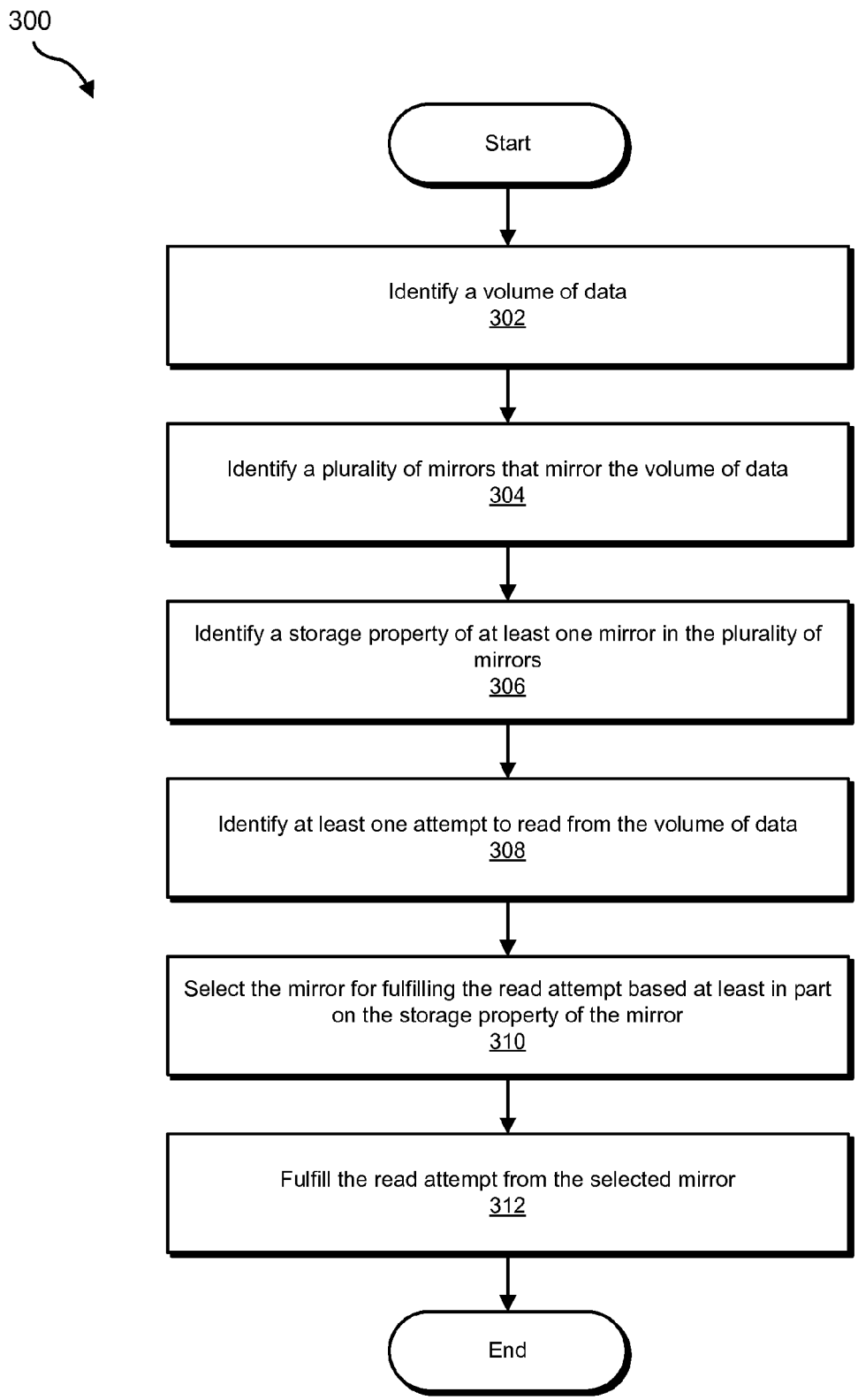
FIG. 3 is a flow diagram of an exemplary method for adaptively preferring mirrors for read operations.

FIG. 3 is a flow diagram of an exemplary computer-implemented method 300 for adaptively preferring mirrors for read operations. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in FIG. 3, at step 302 one or more of the systems described herein may identify a volume of data. For example, at step 302 identification module 104 may, as part of computing system 202 in FIG. 2, identify volume 208. As used herein, the term "volume" may refer to any collection and/or logical unit of data.

Identification module 104 may identify the volume of data in any suitable manner. For example, identification module 104 may identify the volume of data by reading a configuration file identifying the volume of data. Additionally or alternatively, identification module 104 may identify the volume of data as a part of and/or by receiving a message from a volume manager. In some examples, identification module 104 may identify the volume of data as a volume without any configured preferred mirror for read operations.

In some examples, the volume of data may be configured within a block virtualization environment. For example, the volume of data may present a block interface to a file system and/or application for accessing data from the volume. The volume of data may accordingly appear to the file system and/or application as a physical, block-addressable storage device would.

Figure 4:
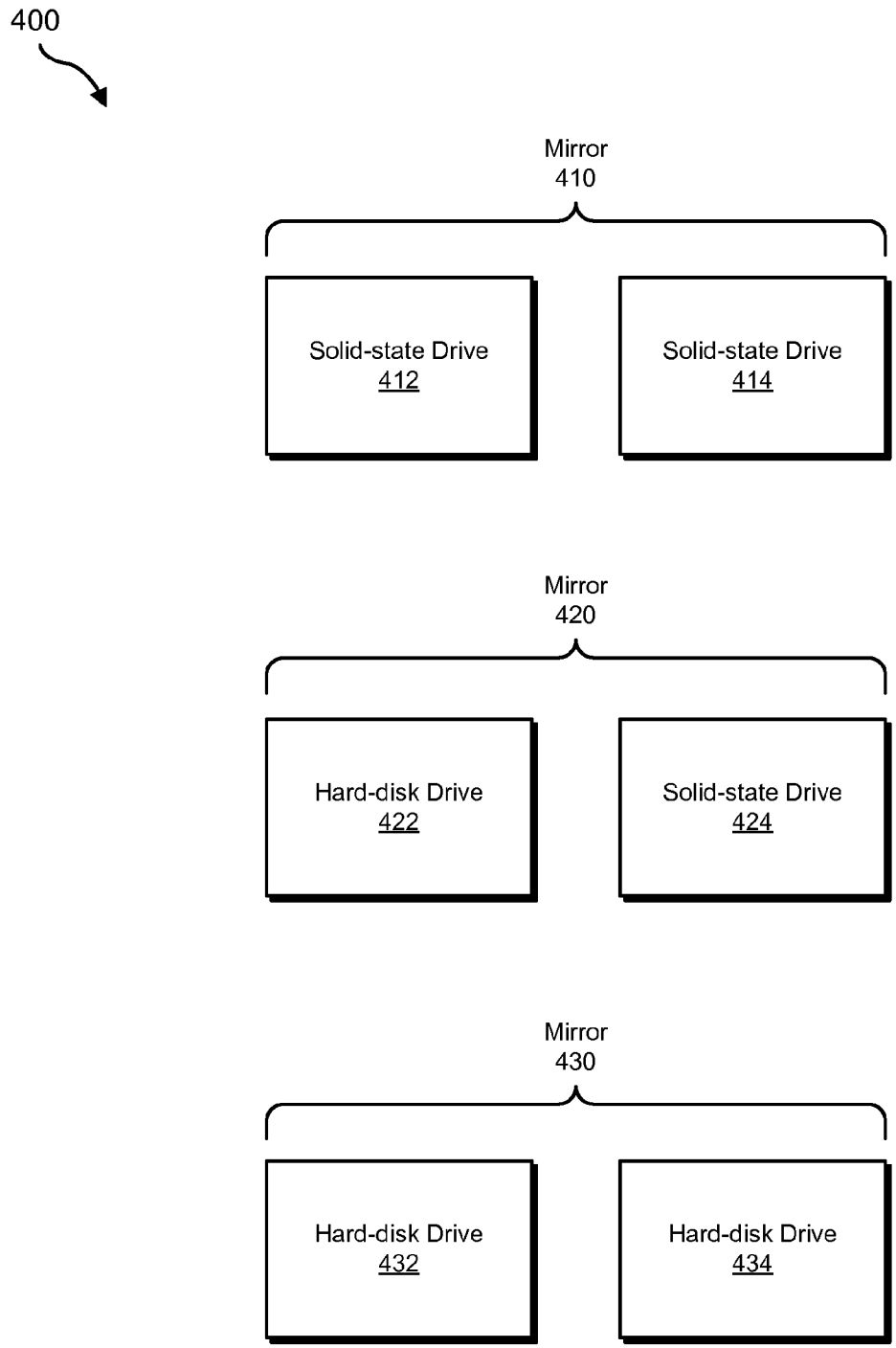
FIG. 4 is a block diagram of an exemplary plurality of mirrors.

At step 304 one or more of the systems described herein may identify a plurality of mirrors that mirror the volume of data. For example, at step 304 identification module 104 may, as part of computing system 202 in FIG. 2, identify plurality of mirrors 206. As another example, FIG. 4 illustrates an exemplary plurality of mirrors 400. Identification module 104 may accordingly identify plurality of mirrors 400 (e.g., mirrors 410, 420, and 430).

As used herein, the term "mirror" may refer to any mirror, plex, and/or other collection of data representing the data of a volume. A mirror of a volume may include a complete logical representation of the volume. In some examples, a mirrored volume may include a primary copy of the volume and mirrors of the primary copy. Additionally or alternatively, a mirrored volume may include only mirrors of the volume (e.g., the volume may serve as a virtual representation of data stored by the mirrors). A mirror may include physical and/or virtual storage devices. In some examples, a mirror within the plurality of mirrors may use a single storage device. Additionally or alternatively, a mirror within the plurality of mirrors may use multiple storage devices.

Identification module 104 may perform step 304 in any suitable manner. For example, identification module 104 may identify the plurality of mirrors by reading a configuration file identifying the plurality of mirrors. Additionally or alternatively, identification module 104 may identify the volume of data as a part of and/or by querying an application linking the volume to the plurality of mirrors, such as a volume manager.

Returning to FIG. 3, at step 306 one or more of the systems described herein may identify a storage property of at least one mirror in the plurality of mirrors. For example, at step 306 identification module 104 may, as part of computing system 202 in FIG. 2, identify a storage property of mirror 206(1) in plurality of mirrors 206. Using FIG. 4 for another example, identification module 104 may identify a storage property of mirror 410. As used herein, the phrase "storage property" may refer to any property relevant to determining the efficiency of accessing data from storage.

Identification module 104 may identify the storage property of the mirror in any suitable manner. For example, identification module 104 may identify at least one storage device underlying the mirror (e.g., storing data for the mirror) and identify a property of the storage device. Identification module 104 may identify the property of the storage device in a variety of ways. For example, identification module 104 may read a configuration file identifying the property of the storage device. Additionally or alternatively, identification module 104 may perform a test on the storage device to identify the property of the storage device.

The property of the storage device may include a variety of types of information. For example, the property of the storage device may include a latency of the storage device. In this example, the property of the storage device may include a seek time of the storage device, a rotational latency of the storage device, a network latency arising from a relative network location of the storage device, or some combination thereof. As another example, the property of the storage device may include a throughput of the storage device. In this example, the property of the storage device may include a transfer rate of the storage device, a transfer rate of a host connected to the storage device, a bandwidth of a network connected to the storage device, or some combination thereof.

In some examples, the property of the storage device may include a media type of the storage device. For example, the storage device may include a solid-state drive. Additionally or alternatively, the storage device may include a hard-disk drive. In some examples, the storage device may include non-volatile random access memory. In these examples, the storage property of the mirror may include an indication of the media type of the storage device (e.g., an indication that the storage device comprises a solid-state drive, a hard-disk drive, non-volatile random access memory, etc.). As used herein, the phrase "solid-state drive" may refer to any storage device using solid-state memory to store data. For example, a solid-state drive may include flash memory and/or dynamic random access memory ("DRAM"). As used herein, the phrase "hard-disk drive" may refer to any storage device using platter-based storage. For example, a hard-disk drive may include a rotating platter that magnetically stores data. As used herein, "non-volatile random access memory" may generally refer to any type of random access memory capable of persistent storage.

In some examples, the mirror may include two or more storage devices. In these examples, identification module 104 may identify a property for each storage device in the plurality of storage devices (e.g., to combine the properties of the storage devices to determine the storage property of the mirror). For example, if all storage devices in the plurality of storage devices have the same media type, identification module 104 may identify the storage property of the mirror as corresponding to that media type. If the mirror includes storage devices with diverse media types, identification module 104 may identify the storage property of the mirror as "MIXED." Using FIG. 4 as an example, plurality of mirrors 400 may include mirrors 410, 420, and 430. Mirror 410 may include a solid-state drive 412 and a solid-state drive 414. Identification module 104 may accordingly identify mirror 410 as having a media-type property of "SOLID-STATE DRIVE." Mirror 420 may include a hard-disk drive 422 and a solid-state drive 424. Identification module 104 may accordingly identify mirror 420 as having a media-type property of "MIXED." Mirror 430 may include a hard-disk drive 432 and a hard-disk drive 434. Identification module 104 may accordingly identify mirror 430 as having a media-type property of "HARD-DISK DRIVE."

Returning to FIG. 3, at step 308 one or more of the systems described herein may identify at least one attempt to read from the volume of data. For example, at step 308 interception module 106 may, as part of computing system 202 in FIG. 2, identify read attempt 210 directed to volume 208.

Interception module 106 may perform step 308 in any suitable manner. For example, interception module 106 may include at least a portion of a volume manager that manages the volume. In this example, interception module 106 may identify the read attempt when the read attempt and/or an indication of the read attempt is directed to and/or observed by the volume manager. Additionally or alternatively, interception module 106 may include at least a portion of a file system driver. In this example, interception module 106 may identify the read attempt as the read attempt is processed by the file system driver.

At step 310 one or more of the systems described herein may select the mirror for fulfilling the read attempt based at least in part on the storage property of the mirror. For example, at step 310 selection module 108 may, as part of computing system 202 in FIG. 2, select mirror 206(1) for fulfilling read attempt 210. Using FIG. 4 for another example, selection module 108 may select mirror 410 for fulfilling the read attempt.

Selection module 108 may select the mirror in a variety of contexts. For example selection module 108 may select the mirror in response to the read attempt. Additionally or alternatively, selection module 108 may, as part of selecting the mirror, prefer the selected mirror for fulfilling read attempts directed to the volume of data. For example, selection module 108 may configure the volume within a volume manager such that the mirror will be used for fulfilling subsequent read attempts directed to the volume of data.

In some examples, selection module 108 may select more than one mirror. For example, selection module 108 may select a list of mirrors based on the storage property (e.g., a list of mirrors ordered by throughput), so that if a read attempt made on one mirror results in an error, a volume manager may fall back on the next mirror in the list. Additionally or alternatively, selection module 108 may select a subset of mirrors from the plurality of mirrors based on the storage property (e.g., all mirrors based on solid-state storage devices) and then select the mirror from the subset according to a rotation schedule applied to the subset. For example, if five mirrors within the plurality of mirrors are based entirely on solid-state storage devices, selection module 108 may forward read attempts to each of the five mirrors using a round-robin scheme. Accordingly, each mirror may fulfill every fifth read attempt directed to the volume of data.

In some examples, selection module 108 may select a mirror with a media-type property of "SOLID-STATE DRIVE" over mirrors with media-type properties of "MIXED" or "HARD-DISK DRIVE." In some examples, selection module 108 may select a mirror with a media-type property of "MIXED" over a mirror with a media-type property of "HARD-DISK DRIVE." Additionally or alternatively, selection module 108 may select a "MIXED" mirror for fulfilling the read attempt if the read attempt will resolve to a solid-state drive underlying the mirror.

Selection module 108 may also use a variety of other information in addition to and/or in conjunction with the storage property to select the mirror. For example, selection module 108 may use real-time usage information of the mirror and/or storage devices underlying the mirror. For example, if the input/output load on a mirror exceeds a threshold (e.g., determined by one or more properties of one or more storage devices underlying the mirror), selection module 108 may select an alternative mirror. In another example, selection module 108 may consider any costs associated with accessing a mirror in addition to factors impacting performance. Additionally or alternatively, selection module 108 may select a mirror for a read request based at least in part on the source of the read request (e.g., in order to comply with quality-of service and/or service-level agreements associated with the source of the request request).

Generally, selection module 108 may select, prefer, and/or prioritize mirrors using storage properties of the mirrors to determine which mirrors will likely result in the most efficient operations. Using FIG. 4 as an example, selection module 108 may select mirror 410 instead of mirrors 420 and 430 because solid-state drives 412 and 414 underlie mirror 410 and solid-state drives may fulfill read attempts more efficiently than hard-disk drives.

Returning to FIG. 3, at step 312 one or more of the systems described herein may fulfill the read attempt from the selected mirror. For example, at step 312 fulfillment module 110 may, as part of computing system 202 in FIG. 2, fulfill read attempt 210 from mirror 206(1). Using FIG. 4 for another example, fulfillment module 110 may fulfill the read attempt from mirror 410.

Fulfillment module 110 may perform step 312 in any suitable manner. For example, fulfillment module 110 may configure a volume manager to fulfill read attempts directed to the volume from the selected mirror. In some examples, fulfillment module 110 may include at least a portion of a file system driver. In these examples, fulfillment module 110 may fulfill the read attempt by reading from the selected mirror when processing an attempt to read from the volume.

In some examples, fulfillment module 110 may fulfill the read attempt from multiple mirrors. For example, fulfillment module 110 may select a subset of mirrors from the plurality of mirrors. Fulfillment module 110 may select the subset of mirrors based on the storage property of the mirrors. In some examples, fulfillment module 110 may select the subset of mirrors from a list of mirrors previously selected by selection module 108.

After selecting the subset of mirrors, fulfillment module 110 may divide the read attempt into a plurality of read operations. For example, fulfillment module 110 may divide the read attempt such that each of the read operations corresponds to a mirror in the subset of mirrors. After dividing the read attempt, fulfillment module 110 may perform each read operation in the plurality of mirrors on a corresponding mirror in the subset of mirrors. Fulfillment module 110 may subsequently assemble the results of the read operations to construct a complete response to the read attempt. In this manner, fulfillment module 110 may more efficiently fulfill the read attempt (e.g., by distributing the workload of the read attempt across the subset of mirrors).

In the above example, fulfillment module 110 may divide the read attempt such that groups of read operations may be fulfilled by mirrors with matching storage properties. For example, if some of the read operations are bound to be fulfilled by one or more mirrors with a storage property of "HARD-DISK DRIVE," fulfillment module 110 may assign all the read operations to mirrors with a storage property of "HARD-DISK DRIVE." Additionally or alternatively, if a read request directed to a "MIXED" mirror were to span underlying devices such that part of the request would resolve to a solid-state drive while another part would resolve to a hard-disk drive, fulfillment module 110 may assign read operations pertaining to the former part to "SOLID-STATE DRIVE" mirrors and assign read operations pertaining to the latter part to "HARD-DISK DRIVE" mirrors.

In some examples, when attempt to fulfill the read attempt, fulfillment module 110 may receive an error from the selected mirror (e.g., due to an error from an underlying storage device). In these examples, fulfillment module 110 may fulfill the read attempt from another mirror. For example, as mentioned earlier, selection module 108 may have selected a list of mirrors. In this example, fulfillment module 110 may fall back to the next mirror on the list. Additionally or alternatively, fulfillment module 110 may request selection module 108 to select a different mirror.

Figure 5:
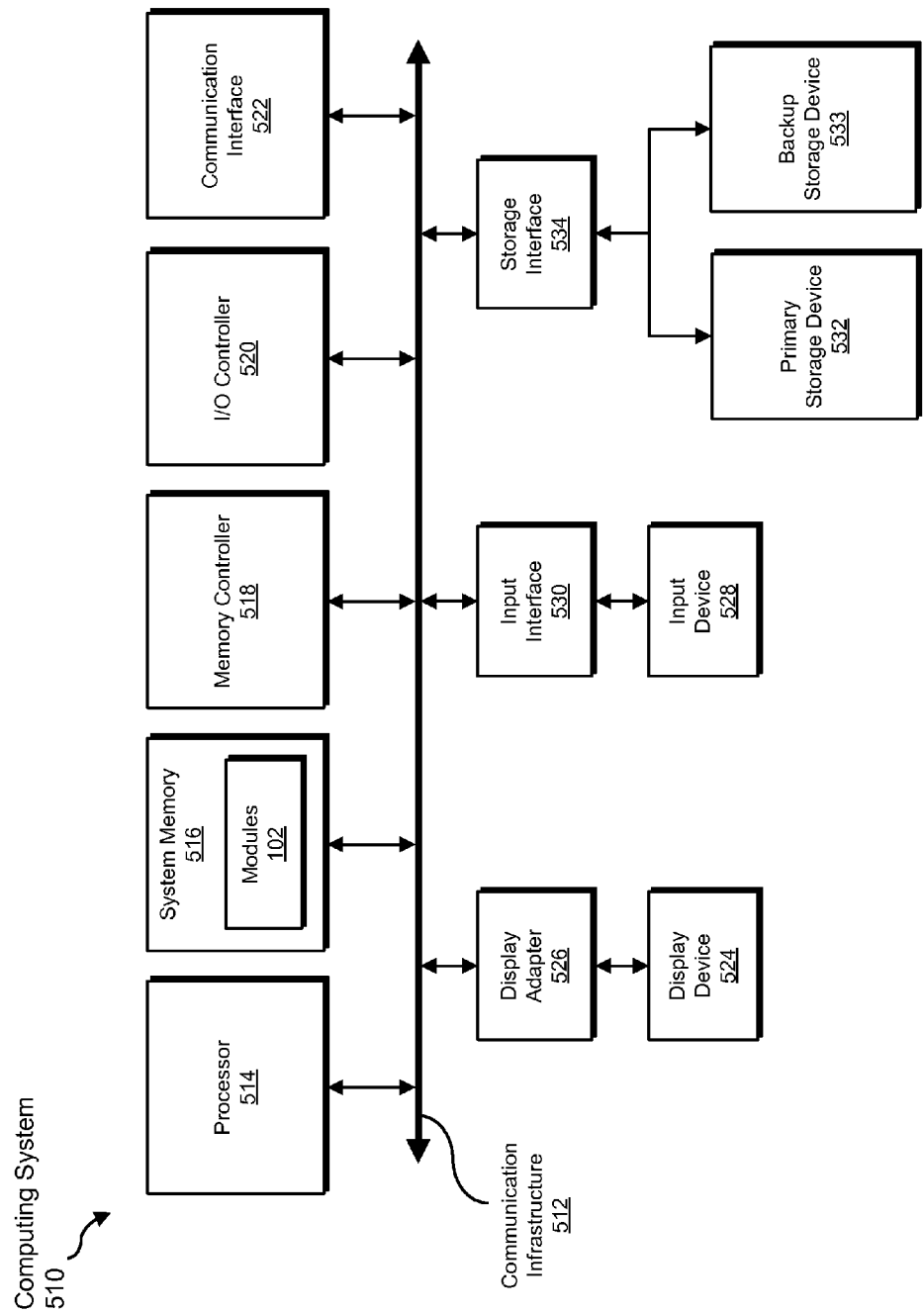
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the identifying, selecting, preferring, fulfilling, dividing, and/or performing steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an input/output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller 518 may perform and/or be a means for performing, either alone or in combination with other elements, one or more of the steps or features described and/or illustrated herein, such as identifying, selecting, preferring, fulfilling, dividing, and/or performing.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the identifying, selecting, preferring, fulfilling, dividing, and/or performing steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the identifying, selecting, preferring, fulfilling, dividing, and/or performing steps disclosed herein. Communication interface 522 may also be used to perform and/or be a means for performing other steps and features set forth in the instant disclosure.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the identifying, selecting, preferring, fulfilling, dividing, and/or performing steps disclosed herein. Input device 528 may also be used to perform and/or be a means for performing other steps and features set forth in the instant disclosure.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the identifying, selecting, preferring, fulfilling, dividing, and/or performing steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
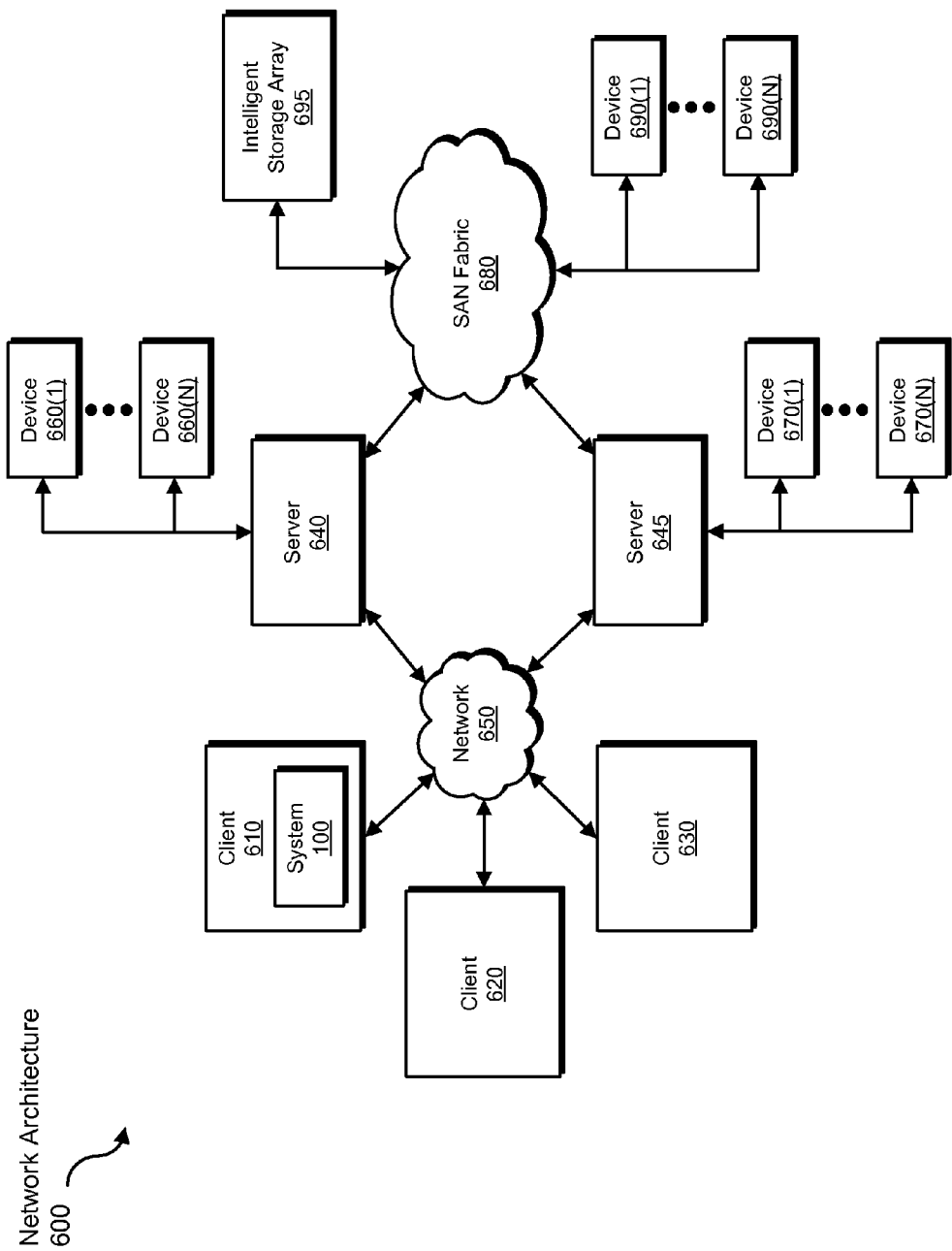
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5. In one example, client system 610 may include system 100 from FIG. 1.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the identifying, selecting, preferring, fulfilling, dividing, and/or performing steps disclosed herein. Network architecture 600 may also be used to perform and/or be a means for performing other steps and features set forth in the instant disclosure.

As detailed above, computing system 510 and/or one or more components of network architecture 600 may perform and/or be a means for performing, either alone or in combination with other elements, one or more steps of an exemplary method for adaptively preferring mirrors for read operations.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform a mirrored volume into an adaptively efficient mirrored volume by automatically selecting an optimal mirror for read attempts.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for adaptively preferring mirrors for read operations, at least a portion of the method being performed by a computing device comprising at least one processor, the method comprising:
   identifying a volume of data;
   identifying a plurality of mirrors that mirror the volume of data;
   identifying a media type of at least one mirror in the plurality of mirrors, the media type of the mirror indicating a hardware configuration of a storage device underlying the mirror, wherein the mirror comprises the storage device;
   intercepting at least one attempt to read from the volume of data;
   selecting the mirror for fulfilling the read attempt based at least in part on the media type of the mirror indicating the hardware configuration of the storage device underlying the mirror;
   fulfilling the read attempt from the selected mirror while processing the attempt to read from the volume of data.

2. The computer-implemented method of claim 1, wherein identifying the media type of the mirror comprises
   identifying real-time input/output load information for the mirror.

3. The computer-implemented method of claim 2, wherein selecting the mirror for fulfilling the read attempt comprises determining that an input/output load of an additional mirror exceeds a predetermined threshold and, in response to the determination, selecting the mirror instead of the additional mirror.

4. The computer-implemented method of claim 1, wherein the read attempt is intercepted by an interception module while a file system driver processes the read attempt.

5. The computer-implemented method of claim 1, wherein:
   the mirror comprises a plurality of storage devices;
   identifying the media type of the mirror comprises identifying a hardware configuration for each storage device in the plurality of storage devices.

6. The computer-implemented method of claim 1, wherein selecting the mirror for fulfilling the read attempt comprises:
   selecting a subset of mirrors from the plurality of mirrors based at least in part on the media type;
   selecting the mirror from the subset of mirrors based at least in part on a rotation schedule applied to the subset of mirrors.

7. The computer-implemented method of claim 1, wherein fulfilling the read attempt from the selected mirror comprises:
   selecting a subset of mirrors from the plurality of mirrors based at least in part on the media type, the subset of mirrors comprising the mirror;
   dividing the read attempt into a plurality of read operations;
   performing each read operation in the plurality of read operations on a corresponding mirror in the subset of mirrors such that a workload of the read attempt is distributed across the subset of mirrors.

8. The computer-implemented method of claim 1, wherein selecting the mirror for fulfilling the read attempt comprises preferring the selected mirror for fulfilling read attempts directed to the volume of data by configuring a volume manager of the volume of data such that the mirror will be used for fulfilling subsequent read attempts directed to the volume of data.

9. The computer-implemented method of claim 1, wherein the volume of data comprises a volume configured for use within a block virtualization environment in which the volume of data presents a block interface to a file system and/or application for accessing data from the volume of data.

10. A system for adaptively preferring mirrors for read operations, the system comprising:
  an identification module programmed to:
    identify a volume of data;
    identify a plurality of mirrors that mirror the volume of data;
    identify a media type of at least one mirror in the plurality of mirrors, the media type of the mirror indicating a hardware configuration of a storage device underlying the mirror, wherein the mirror comprises the storage device;
  an interception module programmed to identify at least one attempt to read from the volume of data;
  a selection module programmed to select the mirror for fulfilling the read attempt based at least in part on the media type of the mirror indicating the hardware configuration of the storage device underlying the mirror;
  a fulfillment module programmed to fulfill the read attempt from the selected mirror while processing the attempt to read from the volume of data;
  at least one processor configured to execute the identification module, the interception module, the selection module, and the fulfillment module.

11. The system of claim 10, wherein the identification module is programmed to identify the media type of the mirror by:
  identifying the storage device underlying the mirror;
  identifying a property of the storage device.

12. The system of claim 11, wherein the property of the storage device comprises at least one of:
  the hardware configuration of the storage device;
  a latency of the storage device;
  a throughput of the storage device.

13. The system of claim 11, wherein the media type comprises at least one of:
  an indication that the mirror is a mixed mirror that comprises at least one solid state storage device and at least one hard-disk drive.

14. The system of claim 10, wherein:
  the mirror comprises a plurality of storage devices;
  the identification module is programmed to identify the media type of the mirror by identifying a hardware configuration for each storage device in the plurality of storage devices.

15. The system of claim 10, wherein the selection module is programmed to select the mirror for fulfilling the read attempt by:
  selecting a subset of mirrors from the plurality of mirrors based at least in part on the media type;
  selecting the mirror from the subset of mirrors based at least in part on a rotation schedule applied to the subset of mirrors.

16. The system of claim 10, wherein the fulfillment module is programmed to fulfill the read attempt from the selected mirror by:
  selecting a subset of mirrors from the plurality of mirrors based at least in part on the media type, the subset of mirrors comprising the mirror;
  dividing the read attempt into a plurality of read operations;
  performing each read operation in the plurality of read operations on a corresponding mirror in the subset of mirrors.

17. The system of claim 10, wherein the selection module is programmed to select the mirror for fulfilling the read attempt by preferring the selected mirror for fulfilling read attempts directed to the volume of data.

18. The system of claim 10, wherein the volume of data comprises a volume configured for use within a block virtualization environment.

19. A non-transitory computer-readable-storage medium comprising one or more computer-executable instructions that, when executed by at least one processor of a computing device, cause the computing device to:
  identify a volume of data;
  identify a plurality of mirrors that mirror the volume of data;
  identify a media type of at least one mirror in the plurality of mirrors, the media type of the mirror indicating a hardware configuration of a storage device underlying the mirror, wherein the mirror comprises the storage device;
  intercept at least one attempt to read from the volume of data;
  select the mirror for fulfilling the read attempt based at least in part on the media type of the mirror indicating the hardware configuration of the storage device underlying the mirror;
  fulfill the read attempt from the selected mirror while processing the attempt to read from the volume of data.

20. The non-transitory computer-readable-storage medium of claim 19, wherein identifying the media type of the mirror comprises:
  identifying the storage device underlying the mirror;
  identifying a property of the storage device.

* * * * *